United States Patent [19]

Grassberger

[11] Patent Number: 5,058,860
[45] Date of Patent: Oct. 22, 1991

[54] PAIR OF HARD MATERIAL PLATES FOR A FAUCET OF THE SCREW TYPE, HAVING AN EXTENDED CONTROL FIELD

[75] Inventor: Roland Grassberger, Brussels, Belgium

[73] Assignee: Studio Tecnico Sviluppo e Ricerche S.T.S.R. S.r.l., Milan, Italy

[21] Appl. No.: 524,963

[22] Filed: May 18, 1990

[30] Foreign Application Priority Data

Jun. 9, 1989 [IT] Italy .................... 67464 A/89

[51] Int. Cl.$^5$ .................... F16K 3/06; F16K 3/32
[52] U.S. Cl. .................... 251/208; 251/205
[58] Field of Search .................... 251/208, 205; 137/625.31, 625.3

[56] References Cited

U.S. PATENT DOCUMENTS

| | | | |
|---|---|---|---|
| 3,424,200 | 1/1969 | Marley et al. | 137/625.31 |
| 3,812,882 | 5/1974 | Taylor | 251/208 X |
| 3,934,612 | 1/1976 | Kast | 137/625.31 X |
| 4,327,758 | 5/1982 | Uhlmann | 251/208 X |
| 4,887,793 | 12/1989 | Hernandez et al. | 251/208 |

Primary Examiner—Arnold Rosenthal
Attorney, Agent, or Firm—Young & Thompson

[57] ABSTRACT

A pair of plates of a hard material (a socalled ceramic material or the like), intended to form the members for flow control of a faucet of the socalled screw type, and having an extended control field, wherein at least one of the sides which define the passage opening of at least one of the plates of the pair has substantially the shape of an arc of linear spiral (Archimedes' spiral), and the end portion having the smaller width of the passage opening defined by this arc of linear spiral is located near the plate periphery. The stated shape like an arc of linear spiral may be chosen for one side of the passage opening of one plate only, or even for one side of the passage openings of both plates, but in this latter case it is needed that the two spirals have a different slope. By means of this pair of plates it is possible to obtain control angles extending in the field from ½ turn and ¾ of a turn, for example angles of 230° or 270°.

5 Claims, 4 Drawing Sheets

PAIR OF HARD MATERIAL PLATES FOR A FAUCET OF THE SCREW TYPE, HAVING AN EXTENDED CONTROL FIELD

BACKGROUND OF THE INVENTION

The subject of the present invention is a pair of plates of a hard material (a socalled ceramic material or the like), intended for forming the flow control means of a faucet of the socalled screw type, and having an extended control field.

The screw faucets having a pair of hard material plates comprise a fixed plate traversed by a through passage opening, and a movable plate superimposed to and contacting the fixed plate, having a passage opening as well and connected to control means which allow to rotate the same. The passage openings of the fixed plate and of the movable plate are so designed that in a certain position of the movable plate (closure position) the passage openings of both plates do not register, and therefore a flow brought to pass through the pair of plates is completely intercepted, in another position of the movable plate (position of complete opening) the flow enjoys the maximum passage section allowed by the mutual cooperation of the passage openings of the two plates, which usually corresponds to the passage opening of the movable plate. In the positions intermediate the above mentioned ones the flow enjoys a gradually variable passage section resulting from the partial superimposition of the passage openings of both plates. This allows controlling the flow rate from zero up to the maximum flow rate allowed by the faucet.

In most faucets of the mentioned kind the control angle which leads from the closure position to the position of complete opening amounts to ¼ of a turn or to ½ turn. The choice of such angles is determined by the fact that they may correspond to very simple shapes of the passage openings of the plates, whose manufacture is therefore easy. But such relatively reduced control angles are not favorable for a careful flow control by the user, and for this reason some faucets of this kind have been proposed, wherein the control angle allowed is of ¾ of a turn. This has been obtained by giving the passage opening of the movable plate the shape of a sector of a circle extending on ¼ of a turn, and the passage opening of the fixed plate a shape comprising a first portion being a sector of a circle extending on ¼ of a turn, corresponding to the passage opening of the movable plate, a second connection portion also extending on ¼ of a turn, and a third portion shaped as a curved channel of uniform width, located near the plate center and extending on nearly 1/4 of a turn. This shape of the passage openings of the plates, however, does not give rise to a satisfactory variation law of the flow rate depending upon the angular displacement of the movable plate. In effect, within the field of the very small flow rates a great control sensitivity is obtained, which however in most cases is not needed, whereas the control sensitivity is rather reduced within the field of the middle and middle-high flow rates, namely the field in which usually the faucet is used the most. Moreover, in order to ensure sealing in the closure position, the edges which limit the passage openings of the plates should superimpose the one another at least by a fixed width, and due to the fact that the third portion of the passage opening of the fixed plate is located near the plate center, to this fixed superimposition width corresponds a rather large angle, which cannot be used for the faucet control stroke.

SUMMARY OF THE INVENTION

The object of the present invention is to rationalize the shape of the passage openings in the plates forming the pairs of hard material plates for screw faucets, in order to ensure, on one hand, a more favorable variation law of the flow rate depending upon the angular displacement of the movable plate, and on the other hand the exploitation as complete as possible, for the control purposes, of the displacement angle of the movable plate.

This object is attained, according to the invention, by the fact that at least one of the sides which define the passage opening of at least one of the plates of the pair has substantially the shape of an arc of linear spiral, and that the end portion having the smaller width of the passage opening defined by this arc of linear spiral is located near the plate periphery.

Through all this specification, by the term "linear spiral" there is meant a spiral of the first degree, or Archimedes' spiral, which in polar coordinates is characterized by a linear equation of the type $r = m \cdot Z + n$, where r is the radius vector, Z is the current angle coordinate, m and n are constant parameters.

Due to at least one of the passage openings being delimited by a side substantially shaped like a linear spiral, an extremely gradual variation of the passage section offered to the flow depending upon the angular displacement of the movable plate is obtained. Moreover, thanks to the end portion of smaller width of the passage opening delimited by the linear spiral arc being located near the plate periphery, the angle under which the superimposition width of the opening edges, needed in order to ensure the sealing in the closure position, is viewed by the rotation center of the movable plate, is as reduced as possible, whereby most of the rotation angle of the movable plate may be effectively exploited in order to control the flow rate.

The idea of the invention may be applied with advantage in the pairs of plates intended to operate within an extended control field, included in the range from ½ turn and ¾ of a turn. With the same overall size, a more extended passage section may be offered to the flow by a limited control angle, whereby the faucet may allow a larger maximum flow rate; or even, by using a more extended control angle, a superior control sensitivity may be attained. Thus the designer may select between both these allowed possibilities the compromise which appears more favorable for each application. For example one may choose a control angle of about 230° or about 270°.

Moreover, in applying the invention, the shape like a linear spiral may be adopted for one side of the passage opening of one plate only, or even for one side of the passage openings of both plates, but in this latter case it is needed that the two spirals have a different slope.

BRIEF DESCRIPTION OF THE DRAWINGS

The features and the advantages of the invention may be better understood from the following description of some preferred embodiments, which are diagrammatically represented in the appended drawings, wherein

FIG. 1 shows in orthogonal coordinates the conformation of the passage openings of two plates intended to mutually cooperate according to a first embodiment of the invention, in closure position of the faucet;

FIG. 2 shows the same passage openings in the position in which the faucet starts opening;

FIG. 3 shows the same passage openings in an intermediate control position;

FIG. 4 shows the same passage openings in the position of complete opening of the faucet;

FIG. 5 shows in a manner similar to FIG. 1 the passage openings of two plates according to a second embodiment of the invention;

FIG. 6 shows on an enlarged scale the actual shape of the passage openings according to the first embodiment of the invention, in a realization in which a control angle of about 230° is provided for;

FIG. 7 shows in a manner similar to FIG. 6 the actual shape of the passage openings according to the first embodiment of the invention, in a realization in which a control angle of about 270° is provided for;

FIG. 8 shows in a manner similar to FIG. 6 the actual shape of the passage openings according to the second embodiment of the invention, in a realization in which a control angle of about 230° is provided for;

FIG. 9 shows in a manner similar to FIG. 8 the actual shape of the passage openings according to the second embodiment of the invention, in a realization in which a control angle of about 270° is provided for;

DETAILED DESCRIPTION OF THE PREFERRED EMBODIMENTS

Figure 10:
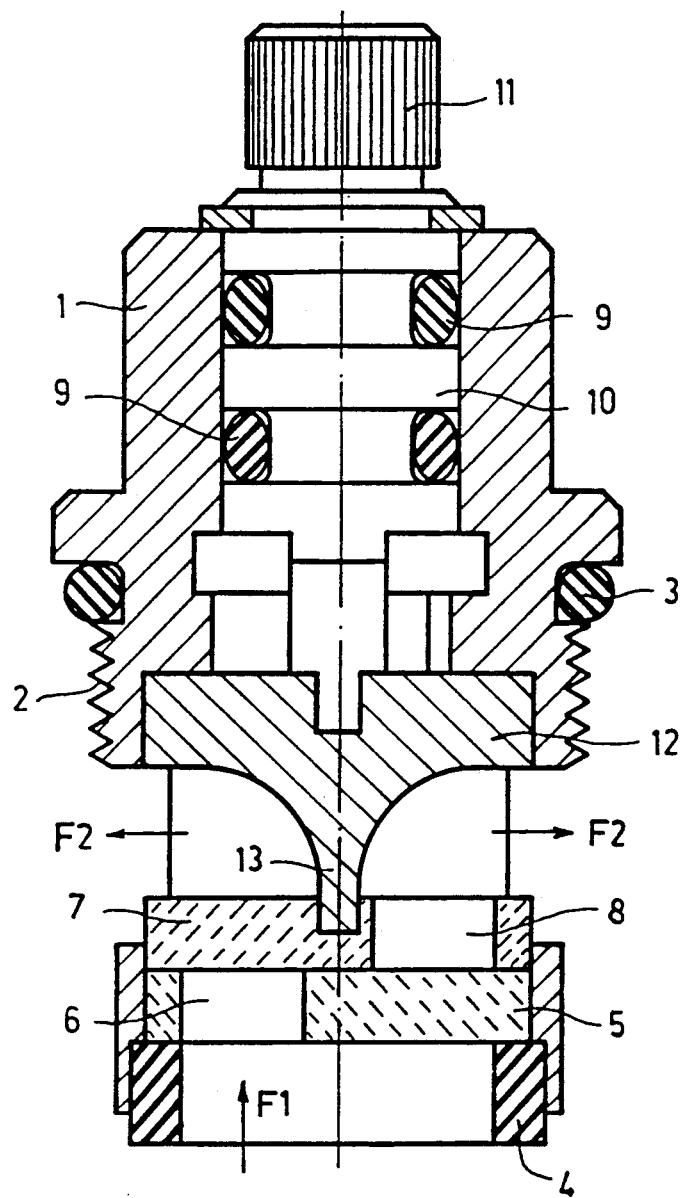
FIG. 10 shows on an enlarged scale an axial section of a screw faucet using a pair of hard material plates according to the invention.

With reference at first to FIG. 10, a socalled screw faucet, of the kind taken into consideration for the application of this invention, comprises a faucet body 1 intended to be screwed by means of a threading 2 into a manifold (not shown) of a valving group, and to seal therein by means of a packing 3. The bottom portion of faucet body 1 is intended to communicate, through a packing 4, with an inlet opening for the water flow to be controlled, which enters along arrow F1 and then flows into the manifold through side openings of the faucet body 1, along arrows F2. A hard material fixed plate 5, having a passage opening 6, is housed within body 1 over packing 4 so as not being allowed to rotate. A movable plate 7, having a passage opening 8 as well, is superimposed to the fixed plate 5 and rotatably contacts the same. In the position shown, the passage openings 6 and 8 of the two plates 5 and 7 do not register, and therefore a closure condition is obtained. Within body 1 there is mounted, sealing by means of packings 9, a shaft 10, which has at its outer end a teeth coupling 11 for a control handle (not shown). At its inner end shaft 10 has a control head 12 which, by means of a key 13, engages the movable plate 7 and imparts to the same any rotation displacements which may have een imparted by means of the control handle to the shaft 10. The hard material plates 5 and 7 form the members for the flow control, and form the pair of plates to which the present invention may be applied.

Figure 1:
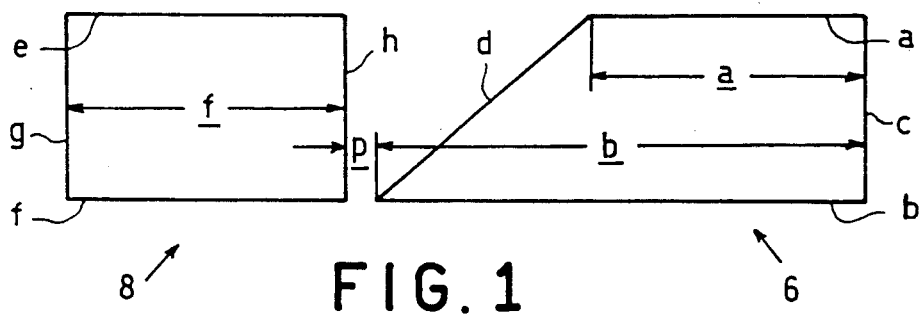
FIGS. 1 to 5 show the transposition in orthogonal coordinates of the conformations which, shown in polar coordinates, define the actual shapes of the passage openings of plates forming a pair according to the invention. This transposition in orthogonal coordinates allows a more easy understanding of the manner in which the passage openings of both plates mutually cooperate. In the drawings.
Figure 2:
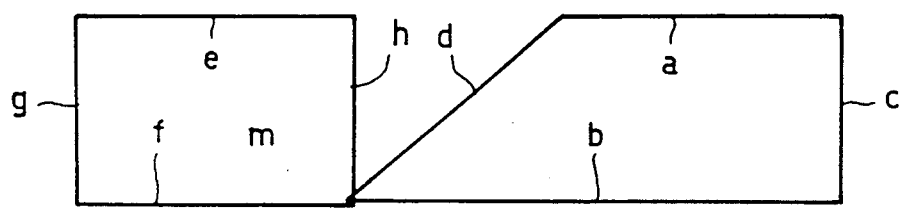
Figure 3:
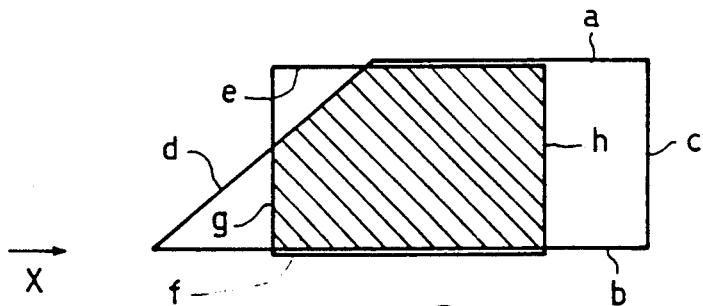

The main idea of the invention will be clarified at first with reference to FIGS. 1 to 4, wherein the actual shape of the plate openings is represented through its transposition from polar cordinates to orthogonal coordinates, whereby the control displacements, which really are rotational, are represented by a horizontal translation (according to arrows X of FIGS. 2 and 3).

In the right hand portion of FIG. 1 there is shown the passage opening 6 of the fixed plate 5. This opening is delimited by four sides a, b, c, d, of which the first three are parallel to the reference axes of the drawing, namely the axes one of which is parallel to arrows X and the other is perpendicular thereto. On the other hand, the side d is inclined with respect to said axes. It will be noticed that, in the actual conformation of the plates (FIGS. 6 and 7), the sides a and b are represented by arcs of circles centered in the rotation axis 0 of the movable plate, the side c is represented by a radius segment, and the inclined side d assumes the shape of an arc of linear spiral.

In the left hand portion of FIG. 1 there is shown in a similar manner the passage opening 8 of the movable plate 7. This opening is delimited, in this embodiment, by four sides e, f, g, h, which are all parallel to the reference axes of the drawing as defined above. In the actual conformation of the plates, sides e and f are represented by arcs of circles centered in the rotation axis 0 of the movable plate, and sides g and h are represented by radius segments. The opening 8 has, therefore, the shape of a circle sector.

Figure 4:
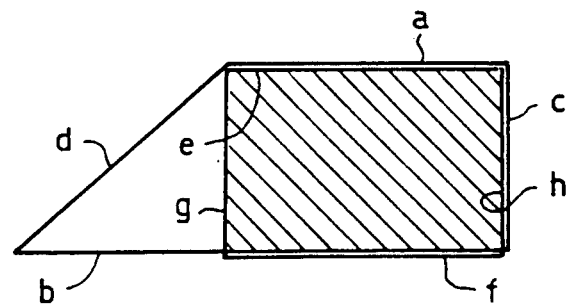

In the closure position, to which refers FIG. 1, the two passage openings 6 and 8 do not mutually register, not only, but in order to ensure the sealing it is needed that their nearer points are spaced at least by a distance p. The opening stroke, which in the actual plates consists of a rotation of the movable plate, is represented in orthogonal coordinates by a translation of opening 8 along arrow X (axis x). When, due to this translation, the distance p has been covered, the openings of the two plates start register and the liquid starts flow. FIG. 2 shows this initial delivery position, wherein the superimposition area of the openings, still very reduced, is shown by m. When the faucet opening increases, the superimposition area of the two openings, shown by hatching in FIGS. 3 and 4, gradually increases until, in the position of complete opening, it involves the entire area of opening 8 of the movable plate (FIG. 4). By looking through these Figures, it is easy to realize the unique graduality of the variation of the passage section offered to the flow depending upon the displacement of the movable plate of the faucet.

By indicating with a the length of side a of opening 6 of the fixed plate, with b the length of side b of the same opening, and with f the common length of sides e and f of opening 8 of the movable plate, it may be noticed that the more favorable dimensioning should be $a=f$, whereas, due to the slope of side d, it should be $b>a$, and therefore also $b>f$.

Now considering the actual shape of the plates (FIGS. 6 and 7), wherein side d assumes the shape of an arc of linear spiral, it is remarked that instead of the lengths taken in consideration above one should consider the angles subtended by the different sides of the openings. Side a now subtends angle A, side b subtends angle B and sides e and f subtend an equal angle F. Equations similar to those above stated are valid, namely $A=F$, $B>A$ and $B>F$.

It should now be noticed that, due to one of the characteristic features of the invention, the end portion of smaller width of the passage opening of the fixed plate (namely the intersection of sides b and d) is located near the periphery, rather than near the center: of the fixed plate. At this point the distance p should be provided for in order to ensure the sealing in the closure position. Because this point is near the plate periphery, the angle under which distance p is viewed from center 0 is very much smaller than it would be if distance p were provided for near the plate center, as according to the known embodiments. Considering that this angle corresponds to an angular stroke not useful for the control purposes, it ensues that the application of the invention allows a better exploitation of the angular control field offered by the plates, when all other conditions are equal.

Figure 6:
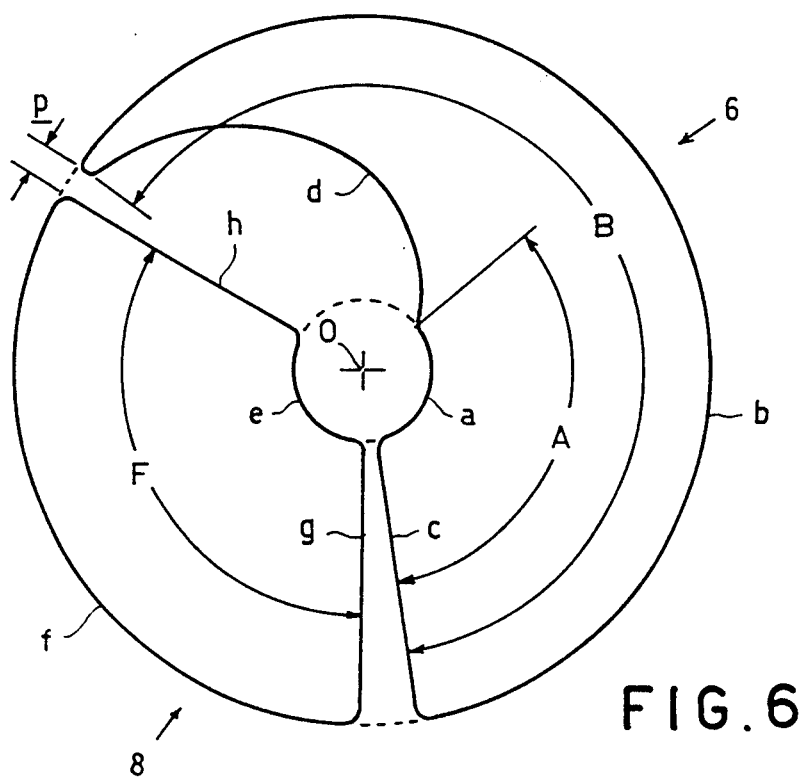
Figure 7:
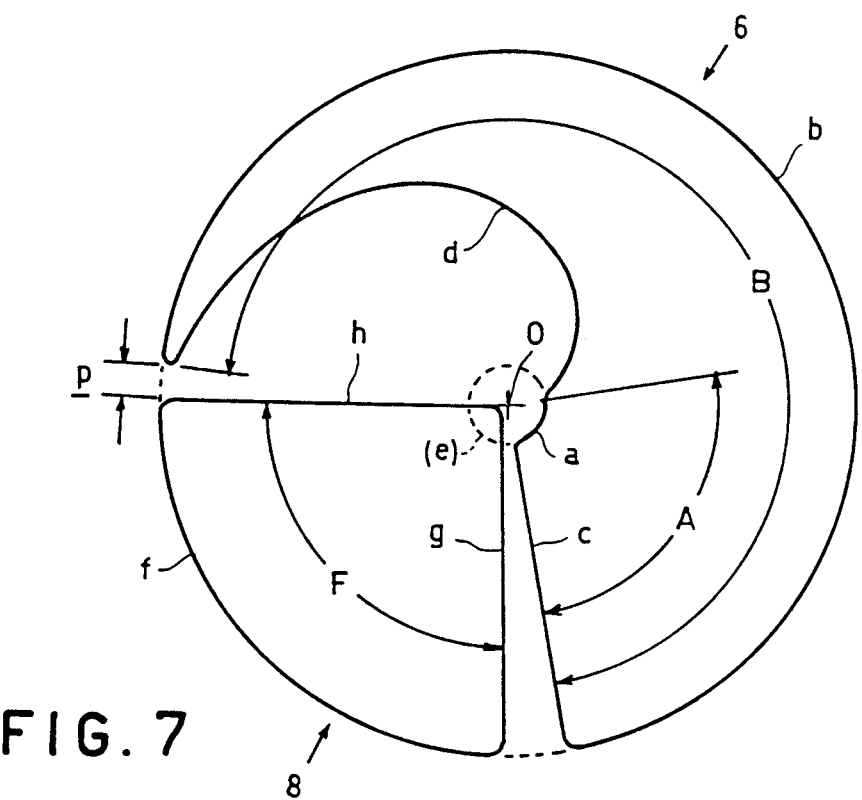

In the realization according to FIG. 6, the values of the characteristic angles of the passage openings of the plates are as follows: $A=F=120°$; $B=225°$; and a control angle of about 235° is obtained. On the other hand, in the realization according to FIG. 7, the values of the cited angles are as follows: $A=F=90°$; $B=260°$; and a control angle of about 270° is obtained. Therefore, in this latter realization a control sensitivity higher than in the former realization is obtained; on the contrary, the maximum flow rate which may be delivered is smaller, due to the smaller extension of the passage opening of the movable plate. It should be understood, however, that the stated values of about 235° and about 270° for the angular control field are only examples; said values may be chosen in any manner within the field from $\frac{1}{2}$ turn to $\frac{3}{4}$ of a turn.

Figure 5:
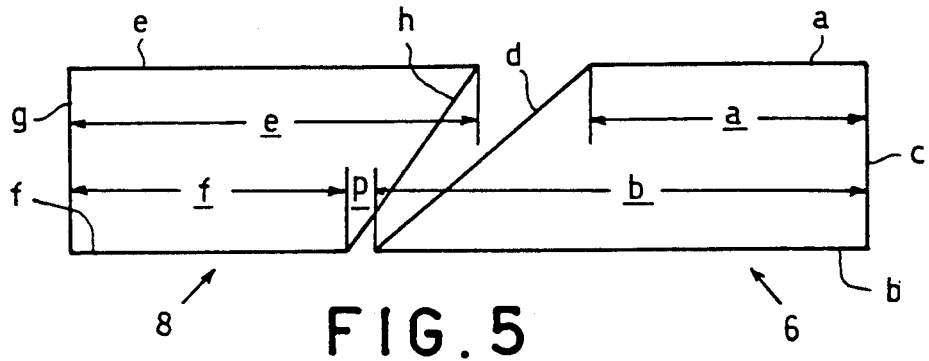
Figure 8:
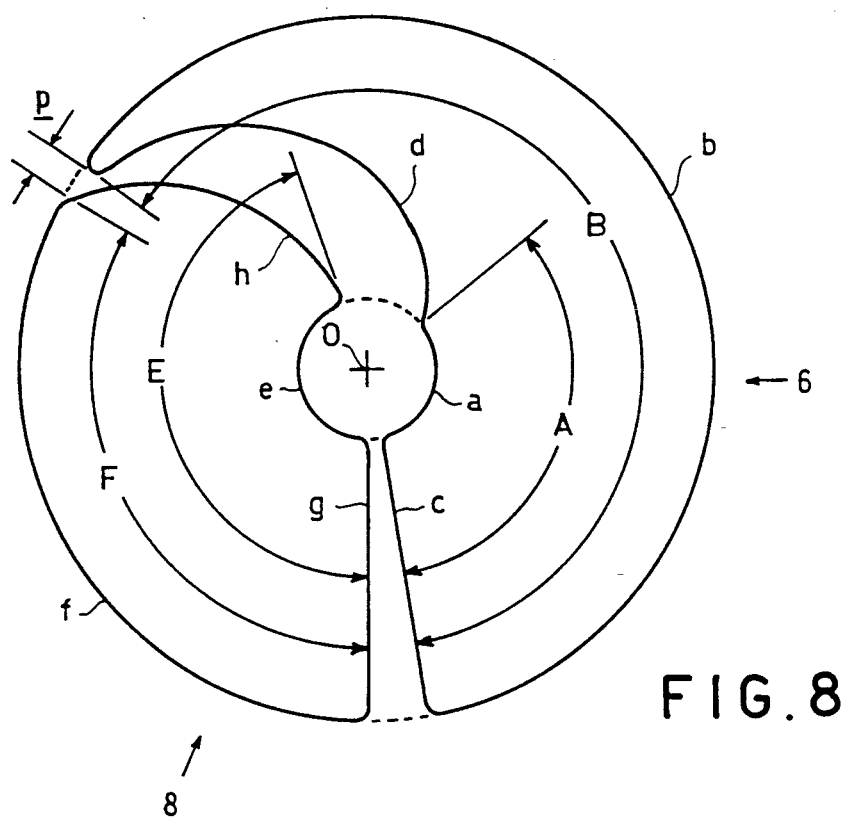
Figure 9:
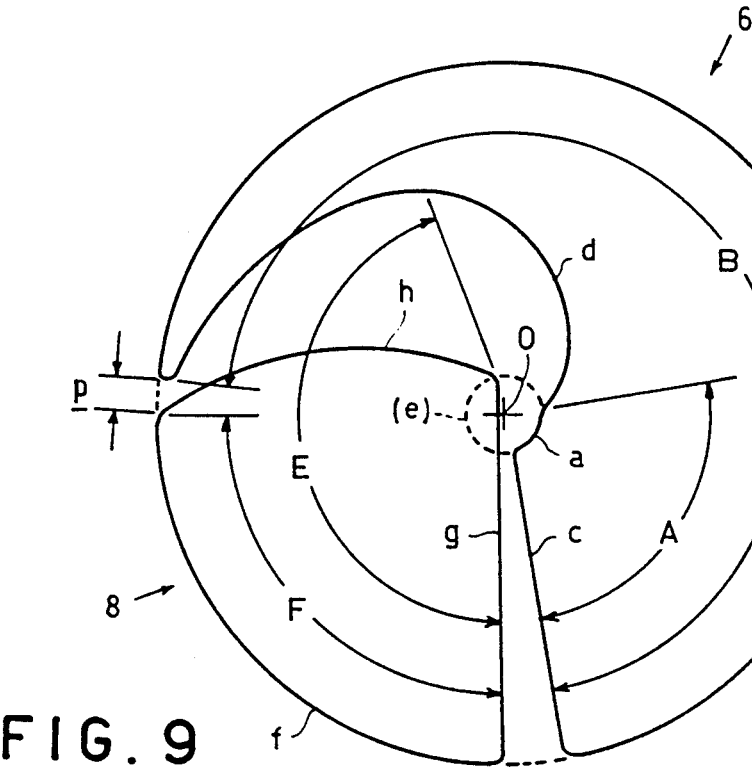

As shown by FIG. 5, side h of the passage opening 8 of the movable plate may be inclined as well, instead of being parallel to one of the reference axes as in the case of FIG. 1. However, in this case the slope of side h should be different from the slope of side d of opening 6 of the fixed plate, in order to ensure the control graduality. In this case sides e and f do no more have a common length f, but they have different lengths e, f, and it should be $e>f$. The mutual behaviour of both cooperating plates is substantially equal to that described with reference to FIGS. 1 to 4. However in this case side h too, in the actual shape of the passage openings of the plates as shown in FIGS. 8 and 9, has the form of an arc of linear spiral. The values of angles A, B and F are equal in both FIGS. 6 and 8, and they are equal in both FIGS. 7 and 9, and the values of the corresponding control angles are substantially equal too. However, as it may be noticed by looking through these Figures, when a shape like a spiral arc is adopted also for side h of the passage opening of the movable plate, the passage opening of the movable plate is somewhat more extended, whereby the delivery of increased maximum flow rates is allowed.

It should be remarked that, in the practical realization of the passage apertures of the plates, the stated conditions do not require to be fulfilled precisely, and even, for reasons of manufacture, some of them may only be approached. Thus, for example, the angular vertices according to FIGS. 1 to 5 should be replaced by connections of a certain radius, as it appears from FIGS. 6 to 9, in order to meet the needs of forming the hard material plates. Moreover nothing excludes that the passage opening of a plate may extend in those regions in which it cannot cooperate with the passage opening of the other plate; thus, according to FIGS. 7 and 9, the sides e of the passage opening of the movable plate have been replaced by a connection between sides g and h, thus simplifying the shape of the involved plate. In a similar manner side f of this opening could be omitted, thus giving rise to a free discharge outwards from the opening of the movable plate.

Finally it should be pointed out that, although in the examples opening 8 has been attributed to the movable plate 7 and opening 6 to the fixed plate 7, these two openings could be exchanged between the fixed and movable plates, without prejudice.

I claim:

1. A pair of plates of a hard material that form the flow control means of a faucet of the screw type, said pair of plates comprising a fixed plate and a movable plate, each said plate having a single passage opening traversing the plate and each passage opening comprising sides which define the outline of the passage opening, wherein at least one of the sides which define the outline of the passage opening of at least one of said plates has substantially the shape of an arc of linear spiral, said passage opening having at least one side in the shape of an arc of linear spiral having first and second end portions, the first end portion having a width smaller than the second end portion, and said first end portion of smaller width being located near the plate periphery.

2. A pair of plates as set forth in claim 1, wherein the passage opening of one plate only of the pair has one side shaped like an arc of a linear spiral.

3. A pair of plates as set forth in claim 1, wherein the passage openings of both plates of the pair have each one side shaped like an arc of a linear spiral, these two spirals having a different slope.

4. A pair of plates as set forth in claim 1, wherein the passage opening of one of the plates of the pair has an angular extent substantially near 90°, thus giving rise to a control angle of about 270°.

5. A pair of plates as set forth in claim 1, wherein the passage opening of one of the plates of the pair has an angular extent substantially near 120°, thus giving rise to a control angle of about 230°.

* * * * *